United States Patent [19]
Arenas

[11] Patent Number: 5,209,702
[45] Date of Patent: May 11, 1993

[54] FREEFALL SIMULATOR

[76] Inventor: Frank Arenas, P.O. Box 1178, Zephyrhills, Fla. 33539

[21] Appl. No.: 693,374

[22] Filed: Apr. 30, 1991

[51] Int. Cl.⁵ .................... G01N 9/00; A63G 31/16
[52] U.S. Cl. ................................. 472/136; 472/137; 434/238
[58] Field of Search .............. 472/137, 136; 434/238

[56] References Cited

U.S. PATENT DOCUMENTS

| | | | |
|---|---|---|---|
| 3,484,953 | 12/1969 | Norheim, Jr. | 472/137 X |
| 4,457,509 | 7/1984 | St-Germain | 472/136 |
| 4,578,037 | 3/1986 | Macangus et al. | 472/137 X |
| 4,700,565 | 10/1987 | Albuschkat | 472/137 X |

*Primary Examiner*—Richard E. Chilcot, Jr.

[57] ABSTRACT

A freefall simulator for producing a controlled airstream in an upward direction, and at a controlled velocity to accommodate all of the human sizes, shapes, forms, and weights, and allow them to practice freefalling, or, freeflight, in an ultra safe environment, and to provide an instructional environment for purposes of teaching freefalling, or, freeflight. The freefall simulator is housed in a building specifically designed for this purpose, having a hydraulic drive train consisting of two separate hydraulic motors, one to provide from 0% to 50% of the power needs of the freefall simulator, and the other to provide the remaining 51% to 100% of the power needs on a controlled increase, on demand, of power to fit the size, shape, and weight of the participant. The entire building is designed for noise abatement, and also has an earth "Berm" surrounding the building to redirect any noise escaping the building into an upward direction.

10 Claims, 5 Drawing Sheets

FREEFALL SIMULATOR

BACKGROUND OF THE INVENTION

Due to the increased popularity of free fall sky diving throughout this nation, and the world, and the demand for a safer, more controlled velocity air flow simulator to provide a base for the introduction of the free fall sensation and human flying aspects to the general public, and act as a true training simulator to the novice, and, on through the advanced sky diver, wishing to practice their free fall skydiving techniques, the inventor has produced a freefall simulator, which he believes to be a much improved and much safer machine than has been taught by the prior arts. As a result of this invention, several of the prior arts were studied, and, has been the experience of the inventor, all of these arts have some serious deficiency's, or, faults, which make them unacceptable for use as a general public free fall simulator, or, sky diver training device, or, advanced certification simulator.

These deficiency's seem to fall into three major categories:; 1. Safety of the design, 2. Noise pollution, and 3. Non-linear power transmission from the power source to the propeller, through the entire power range of the motor. The inventor has spent many Years working with the results of the prior arts, has noted these deficiency's, and has invented a freefall simulation machine which he feels has either eliminated the above problems, or, has greatly improved the art. The following background information will point out the inherent problems encountered in the prior arts, and explain what the inventor has done to correct them. In the design of this machine. An example of one of these faults is taught in the art of Jean St. Germain, in U.S. Pat. No. 4,457,509, where a freefall simulator is constructed using a reciprocating motor, a gear type transmission, and a drive shaft mechanism equipped with universal joints, or, flexible couplings to drive the propeller. Such arrangements of gear driven propellers to supply the stream of air have several inherent operational and safety problem areas, and, contribute to the noise pollution problems when utilized in a high RPM, high torque, power transmission application. These problems arise due to the excessive costs associated with trying to design around the standard aircraft drive system, which is normally a system of planetary gears, too expensive for these simulator applications. In the prior arts studied, and, from past experience of the inventor, these replacement gear driven drive systems, and transmissions, when under power, cause certain components to experience, or create, frequency harmonics, which when allowed to amplify, cause major vibration problems, resulting in physical damage to the transmission unit, the drive shaft, the universal joints, and in some cases, has caused the transmission to actually explode, causing physical injuries to the user of the free fall simulator, and to some of the spectators, not to mention the damage to the equipment, and structure itself. Also, the use of this type of gear train requires constant inspection and maintenance during use, which creates an unsafe working condition for the maintenance person. Annual rebuilding of these units is common practice. In addition, these gear driven units introduce a tremendous noise pollution problem to the surrounding area. Aside from these inherent safety, and noise problems, the inventor found that it is impossible to match the power output of the drive motor to the power needs of the propeller, to furnish the correct air speed to meet the requirements of the various weights of the users, and, in the past experience of the inventor, none of the prior arts could produce the required air speed to meet the terminal speed requirements of the heavier users, and "balloon suits" were required in order to produce a freeflight situation for these persons. The gear shifting nature of a gear type transmission, whereby the maximum power output of any gear arrangement is centered at some mid-range of the gear match chosen, with a somewhat delayed response decrease as the RPM of the motor is decreased, or increased. The power curve derived from a gear train is definitely not a linear function, with the resultant fact that these prior arts cannot continually produce the required air stream speeds for participants of varying weights. The inventor has overcome these problems by employing a new type of hydraulic drive system for the unit. This drive unit employs a high horsepower electric motor, driving two individual hydraulic pumps, each of which feeds power to a hydraulic motor, which in turn, drives the propeller. One of these hydraulic pumps is of a constant output, and supplies 50% of the power requirements of the driving hydraulic motor. The second of these pumps is of a variable output, and, supplies the remainder of the power requirements of the driving motor on a demand basis. If the user of the freeflight machine is of a light weight, then the second hydraulic pump would be set to furnish a lower output than if the user was of a higher weight, but, in each case, the two pumps working in conjunction, can furnish enough power to the driving motor to create the terminal velocity required by the most demanding user. This power is derived without any shifting, or matching, of gears, etc., and a smooth linear transmission of the power from the powering motor to the propeller is attained, producing the correct amounts of air stream for the weight of the person using the Freefall simulator. This hydraulic drive method is thought by the inventor to be a new and unique adaptation of a hydraulic drive system to the simulator industry.

Another problem of the freefall simulator industry, which has been overcome by the inventor, is the directing of the air stream from the propeller, up through the air stream container, to the user, in a full, even volume and even dispursement of air to all areas of the air stream, with no low velocity streams in the center of the air column. In all of the prior arts, studied by the inventors of this freefall simulator, this problem of the low velocity air stream over the center of the propeller, and, on up the air stream, has been encountered. The inventor of the freefall simulator has corrected this problem. The inventor of the freefall simulator has found that this problem is derived from the circular rotation of the propeller, which allows for the slippage of air from the tip of the propeller, and several other parameters. To correct for this problem, the inventor has installed a three step baffle system. The first step, directly over the propeller, is a set of curved baffles, which re-directs the air stream in a true vertical direction, and eliminates most of the swirls. Directly above these vertical baffles are two sets of "S" shaped baffles, one set which directs some of the air stream towards the center of the air stream, above the hub of the propeller, and the other set further from the center of the air stream, which directs the air stream outward from the center of the propeller, and which enlarges the diameter of the air stream, thereby allowing for a much larger area for the user to fly. A third set of baffles is located just below the safety netting and is the final straightener for the air stream, and, provides a final safety grid for the user. Another very important aspect of the inventors design, is the safety netting which keeps the user of the unit from falling onto the metal grid air stream re-director, above the propeller. The prior arts teach a system of netting, not unlike a trampoline top which is supported by elastic strands, or, springs, located at strategic places around the peripheral of the netting. The inventor of the freefall simulator has changed this design to a system of webbing cords, designed to form a complete net over the final grid, each of the crossing cords being attached to the frame of the netting. Therefore, if, by chance, one of the cords breaks, only that little section of the netting will lose its support, and eliminates the possibility of the user falling through the opening created, as is possible in the case of the prior arts studied. In addition to this safety netting, the inventor has added a multi density, layered landing cushion device which incorporates a beveled, or, tapered edge at the peripheral of the safety netting, or, air stream, to eliminate the cause of some serious accidents, when, as in the prior arts, the user inadvertently is ejected from the air stream, and finds themselves partially in, and partially out of the air stream. The multi density, layered cushion adapts to the varying weights of the users, and the tapered edge of the cushion immediately surrounding the air stream allows the users body to land at a safe angle, rather than landing on an edge of a cushion. Further, the inventor has found that when a user is inadvertently ejected from the air stream, and lands on the cushions depicted in the prior arts, there is a possibility of an arm, or leg, being caught between the individual cushions, with the resulting serious accident. The inventor has eliminated the possibility of this sort of accident by eliminating the individual cushions, and providing a continuous covering over the cushions, with "no separations", which eliminates the possibility of an arm, or leg, being caught in the separations. One final safety hazard, as taught in the prior arts studied, and, experienced by the inventor, is the possibility of the novice flyer to be thrown upwards, or, sidewards, ending up "out of control", and being tossed out of, or, thrown too far upwards, with the resulting cause of a major accident The inventor has eliminated this problem by installing a three point harness, which can be worn by the novice, or, the experienced flyer, if desired. This three point harness restricts the movement of the flyer to the extent that they are always held in the air stream. The extent of travel of the harness is adjustable, and therefore is not so restrictive to keep the flyer from experiencing the full extent of the free fall sensation, while still using the safety harness. A final problem with the machines taught in the prior arts is the noise pollution problem, which is introduced by the use of a gear driven transmission system. This noise pollution is of major proportions, due to the use of a large diesel engine, powering a large diameter aircraft propeller, via a system of gear reduction devices, and a drive shaft transmission device. All of these units, working in conjunction, tend to create a noise pollution situation, which is definitely excessive, if not intolerable to the neighbors. The inventor has overcome most of these noise problems via the introduction of a hydraulic drive system, however, additional devices have been invented, to further decrease this noise pollution problem of the freefall simulators of the prior arts. First, a high "berm" noise directing earth pile, completely surrounds the freefall simulator, directing any noise which escapes the building itself, to an upward direction. Second, the understructure of the deck above the propeller is protected with a system consisting of an acoustic blanket of sound proof panels, which absorbs the sound produced inside the freeflight unit itself, rather than allowing them to reach the peripheral of the building.

Third, a system of suspended baffles surround the entire air stream, and peripheral of the unit, to absorb most of the sound waves reaching them, and lastly, a shroud around the peripheral of the propeller itself, consisting of a perforated inner shield, which directs any deflected sound waves to the absorbing acoustical blanket, and allowing the remainder of the sound waves to pass through the perforations, into the center of the unit, which is filled with a sound absorbing batting material. The inventor feels that he has designed a freefall simulator, which is a much improved, much safer, and much more efficient unit, than is taught in the prior arts.

SUMMARY OF THE INVENTION

The freefall simulator described herein provides a controlled upward directed air flow for simulating a fee fall, or, sky diving attitude for the general publics ammusement, or, as a trainer, or practice area for the free fall, or, sky diving enthusiast The freefall simulator consists of a support structure for the flight area itself, and a spectator, participant viewing and or entry, and exit of the flying area walkway, which surrounds and covers the air flow generation system, which is a high RPM, high torque, airplane propeller, directly coupled, via a hydraulic motor, to the constant displacement and variable displacement hydraulic pumps, which are in turn, driven by a 1250 HP electric motor, or possibly two 650 HP electric motors, Working in conjunction, thereby creating a true linear velocity, and linear powered air stream, in a much quieter atmosphere, and coupled with the other inventions described herein, provide a very safe environment for the skydiving enthusiast. The inventor has utilized three-stages of air stream control, and redirection, which provides for a more uniform, and non turbulent air stream across the full spectrum of the flying area, which, when coupled with the more linear output of the power transfer system of this invention, through the hydraulic drive system, provides a more true, and more realistic simulation of the free fall experience. To this improved simulation, the invention offers improved safety features, which further enhances the participants use of this free fall simulator, and to further enhance the freefall simulator industry, the inventor has added several noise abatement inventions to the free flight machine, which makes it more acceptable to the neighborhood.

BRIEF DESCRIPTION OF THE DRAWINGS

Five sheets of drawings are furnished. Sheet 1 contains FIG. 1, sheet 2 contains FIGS. 2, and 3, sheet 3 contains FIGS. 4, and 5, sheet 4 contains FIGS. 6, and 7, and sheet 5 contains FIG. 8.

PREFERRED EMBODIMENT

Figure 1:
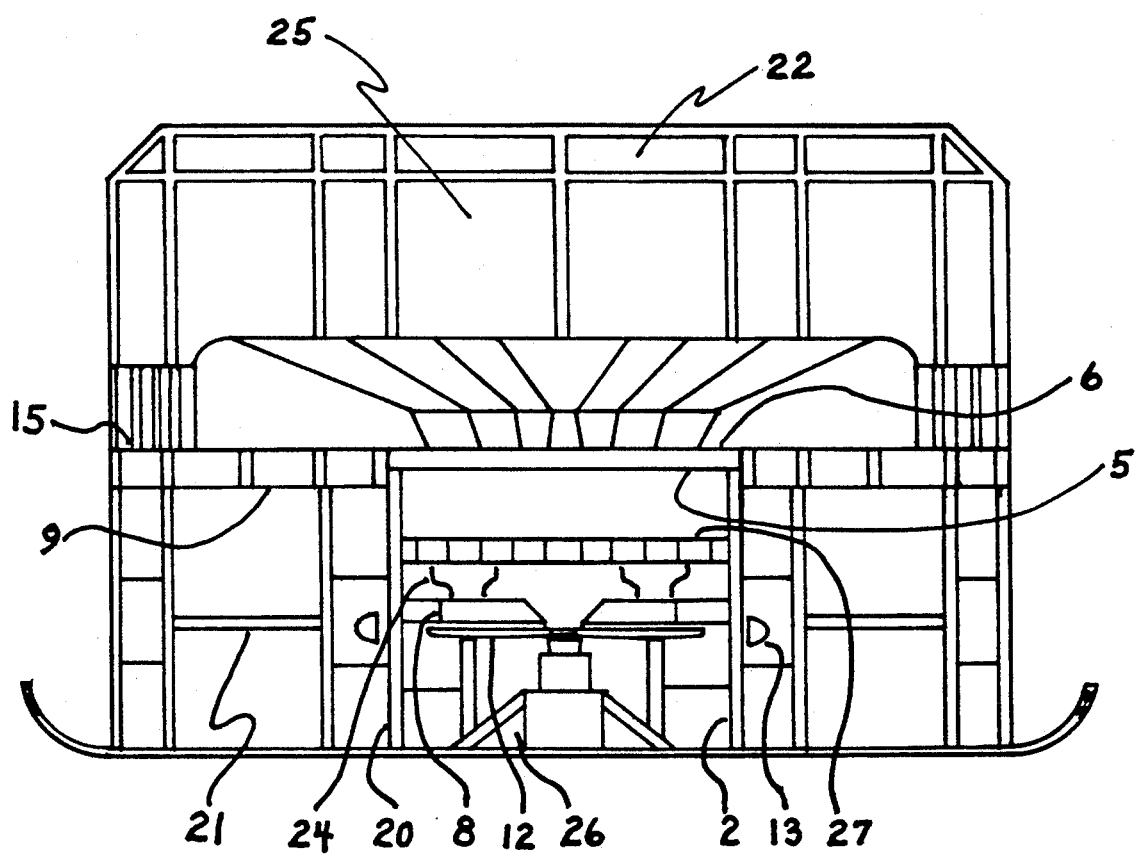
FIG. 1 shows a mid-range cross section view of the building assembly, flight simulation area, and air flow generation, and control section of the simulator.
Figure 2:
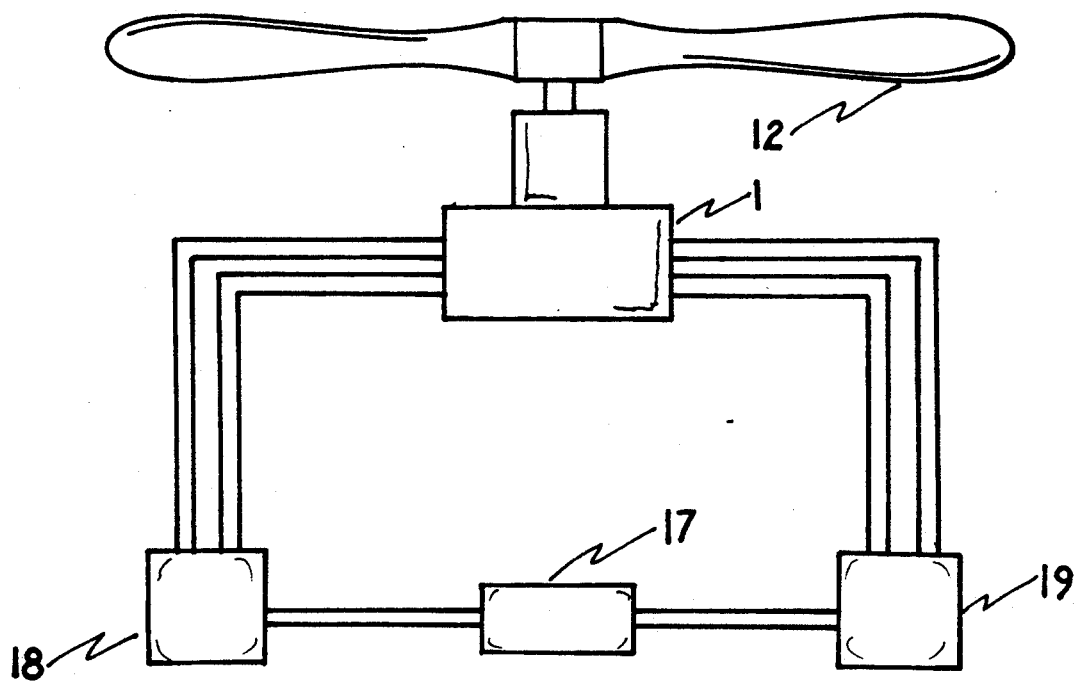
FIG. 2 shows the electric drive motor feeding the two hydraulic pumps, and the hydraulic motor which drives the propeller, and the propeller system.
Figure 5:
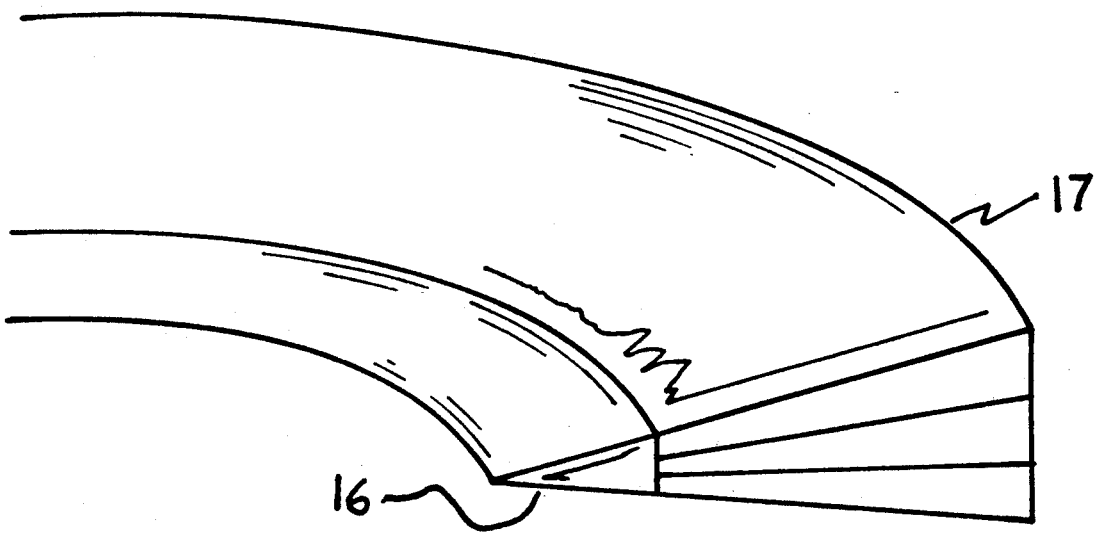
FIG. 5 shows the safety cushion arrangement, With the center angular cushions.
Figure 6:
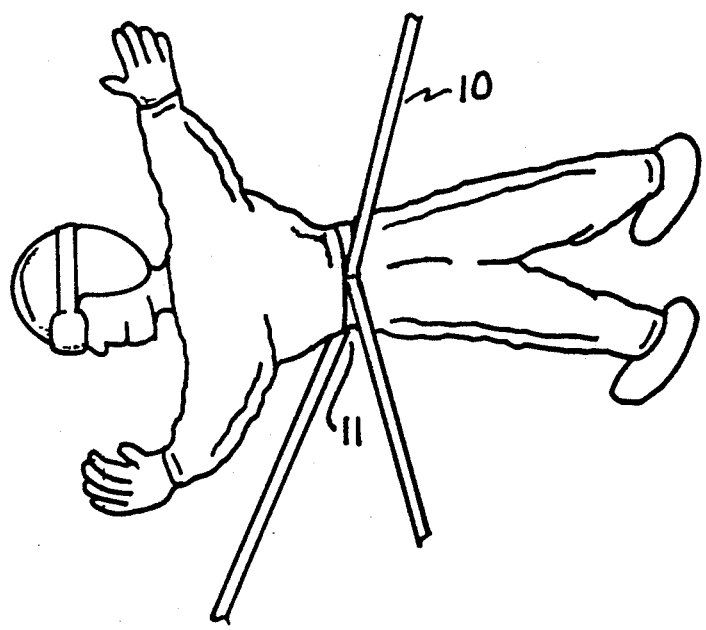
FIG. 6 shows the safety belt, and control lead arrangement.
Figure 7:
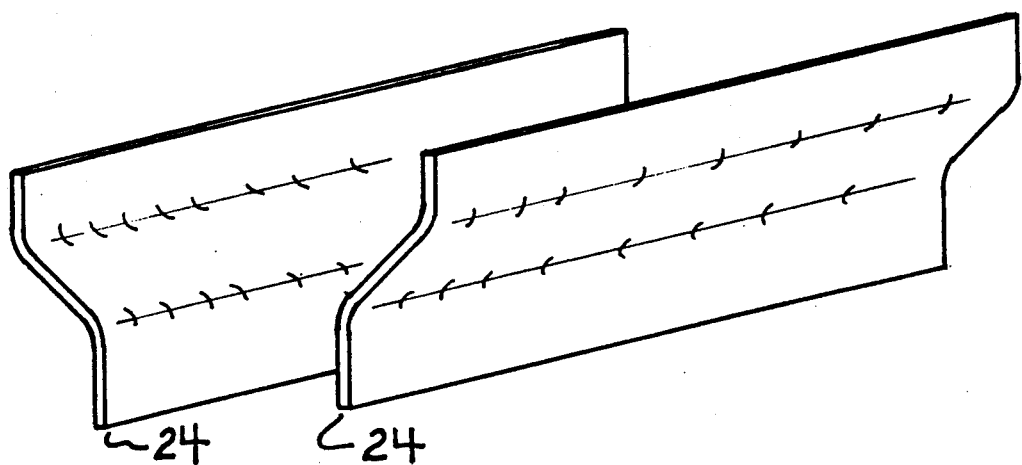
FIG. 7 shows a cross section of the the re-direction vanes.
Figure 8:
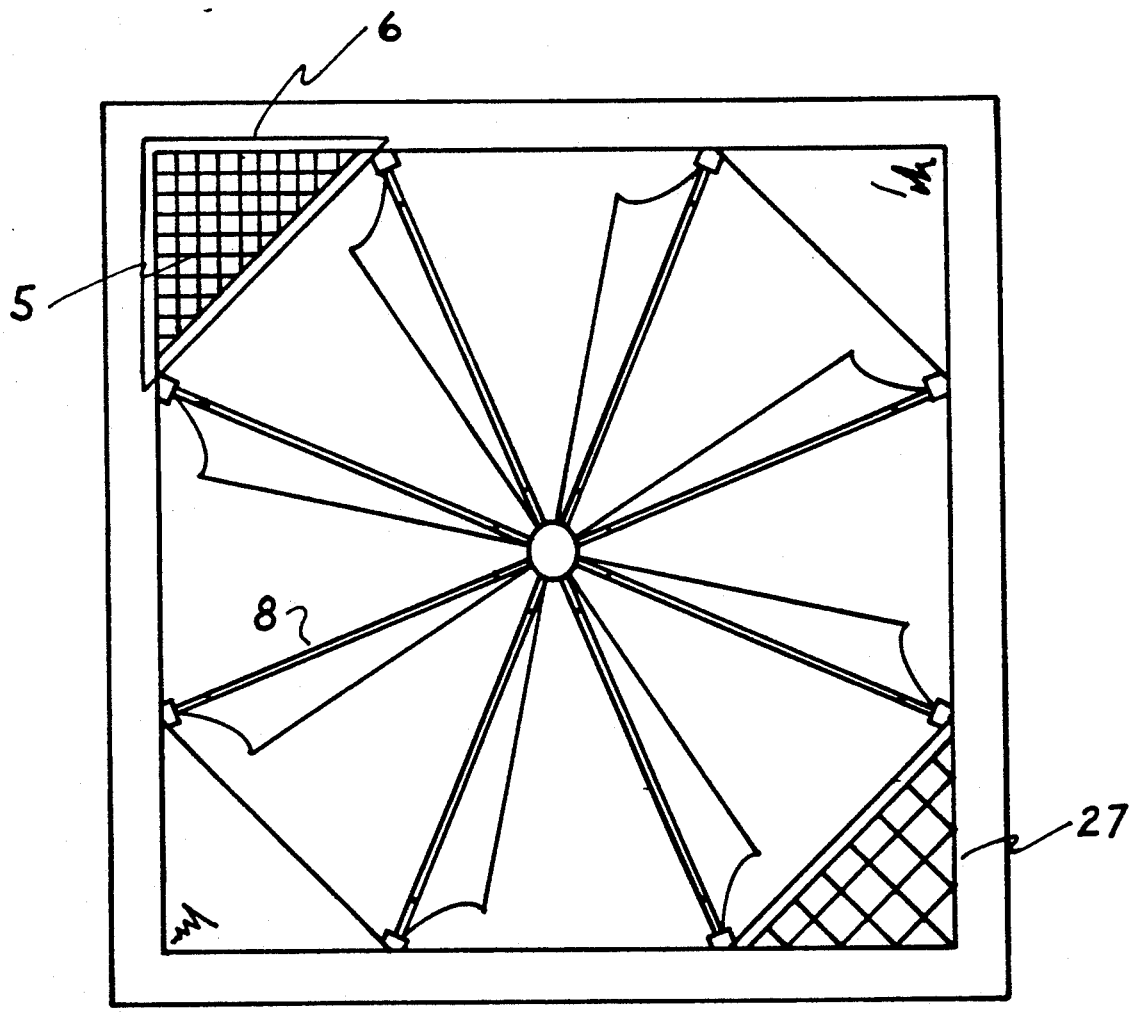
FIG. 8 shows the safety net/trampoline combination propeller safety grid and third stage air control grid, and the first stage air control vanes.

In operation, and referring specifically to FIG. 1, the freeflight machine is mounted in a suitable building, such building constructed of steel scaffolding 21 and steel support columns 20, which when combined, provide a base for the freeflight area 25 and the spectator participant walk way 15. In addition, this steel outer support structure surrounds and provides for the air flow generation chamber 26. Then the entire steel structure is covered by the overhead canopy with awnings 22. The purpose of the steel structure is to provide a base for the air generation system itself, a landing area for the participants disembarking the air stream, and a viewing area for those persons watching, or, in some stage of training for their turn at flying in the air stream. Surrounding the entire steel structure, as will be explained later in the noise abatement portion of this embodiment, is a "berm", or, contoured earth pile, such berm being designed to direct any noise escaping from this steel structure, in an upward direction. A walkway from the office, or entrance to the freefall simulator, provides access to the freefall simulator, over the berm. Now, as can be seen in FIG. 1, a large propeller 12 is mounted in an air stream chamber, such propeller being of a changeable pitch, and of such diameter, and aerodynamics, as to be able to produce an airstream in an upward direction, and of such velocity as to produce a terminal speed for the weight, and size of the freeflight participant in the air stream, such terminal speeds being dependent on the characteristics of the freeflight participant, but, usually in the range of 120-130 miles per hour. Now, referring to FIG. 2, we see the propeller being powered by a high power electric motor 17, such motor 17 being in the range of 1250 H.P. and , such motor 17 driving two hydraulic pumps, 18, and 19. These hydraulic pumps, 18, and 19 are of a special type of pump, and, working in conjunction, provide a hydraulic power source to the final hydraulic motor 1, Which in turn, such hydraulic motor 1 is connected to the propeller 12, which in turn provides the high velocity air stream utilized by the freeflight participant. Now, still referring specifically to FIG. 2, we have two hydraulic pumps, 18, and 19. The first hydraulic pump, 19, is a constant output hydraulic pump 19, so chosen as to produce 50 percent of the power needs of the hydraulic motor 1, which is not enough power to produce the required terminal velocity of the air stream for even the lightest of freeflight participants. Pump 19, however, does produce enough power to the hydraulic motor 1 to turn the propeller. Now, and this is an important part of this invention, the second hydraulic pump 18, is a special unit, not constant output, but of a controlled output design, such design being that the hydraulic pump 18 can produce from 50 to 100 percent of the remaining power needs of the hydraulic motor 1, which such hydraulic motor 1, can now furnish 100 percent of the power needs of the propeller 12, and now, said propeller 12 can, indeed, produce the air stream in a velocity which will in turn produce the required terminal velocity, in a regulated increase of velocity, or, a decrease of velocity, such velocity requirements dependent on the size, and weight of the freeflight participant. In its simplest terms, hydraulic pump 19 produces 50 percent of the power requirements for the propeller, and, as the remaining part of the power requirements are not known in advance, the output of the second hydraulic pump is controlled to produce just that amount of power to the propeller as is required by the freeflight participant. In this manner, and opposed to the teachings in all of the gear driven power trains of the prior arts, a smooth increase, or, decrease in the velocity of the air stream from 50 to 100 percent is produced, which is not possible by a gear driven power train, because of the non-linear power output of a gear shifting mechanism. The inventor feels that this smooth increase, or decrease in the power output of the freeflight machine to be a great improvement in the art of freefall simulators, and, has designed into the invention several other very important features, not taught by the prior arts, which provide other improvements to the freefall simulators. One of the most important aspects of this invention, is in the safety features designed into the freefall simulator. In practice, and in using the products of the prior arts, the inventor has been witness to many accidents of the freefall simulator participants, due to several safety hazards, such hazards being overcome, or, eliminated in this invention. To illustrate, and referring specifically to FIG. 1 again, we see a potentially large safety situation, such safety situation being generated by a large propeller being turned at a high RPM, and a freefall simulator participant flying freely in the air stream being generated by this large propeller. If, by chance, the air stream velocity decreased to the point of not supporting the weight of the freefall simulator participant, which has been the case in the past, without a safety system being incorporated into the design of the freefall simulator, it would be a disastrous situation. Therefore, the inventor has approached this problem very thoroughly, and, has invented a safety system for his invention, which approaches the problem in four levels of safety precaution. The first level is shown in FIG. 6, where we see a system of safety straps 10, and 11,, such straps designed to hold the user well within the airstream, and of such strength as to hold the heaviest user. Safety strap 10 holds the user in such a manner as to not allow them to fall too close to the next level of safety precaution, and, not too high as to create a situation whereby the user could be thrown from the air stream at too much of a height as to cause an accident when landing on the next level of safety precaution. Safety straps 11 attach from the sides of the airstream, and are designed to keep the user from being ejected to the sides of the airstream. The next level of safety precaution is detailed and shown in FIG. 5. In FIG. 5, we see a system of landing cushions, specially designed by the inventor to cushion the fall of a participant. In FIG. 5 we see a section of a circular cushion 7, surrounding an angular cushion 16, and of course, the entire cushion system surrounds the circular air stream. The outer cushion system 7 is fabricated in three layers of cushions, the bottom layer being of a 30 pound per square inch material, the middle layer being of a 20 pounds per square inch material, and the top layer being of a 10 pound per square inch material. This design insures that the user, being ejected from the air stream, will be cushioned upon landing, such as to eliminate the cause of any accident to the user. However, in some cases, in the past experience of the inventor, users are ejected from the air stream in an unplanned manner, and time. In these cases, a very hazardous situation exists, and the inventor has seen cases where the user, being ejected from the air stream involuntarily, has landed half into, and half out of the air stream, on a cushion arrangement with a steep lip, or, edge, and has suffered a broken back. Also, in the prior arts, the cushion arrangement has been of a sectional nature, with individual cushions, having spaces at each side of the individual cushions, whereby the users arm, or leg, has caught in these spaces, or crevices, while the rest of their body continues to move, thereby causing broken bones. The inventor of the freefall simulator has eliminated these safety hazards by utilizing a new and inventive system of landing cushions as shown in FIG. 5, whereby the entire landing cushion is covered with a continuous cover, which eliminates the crevices, and spaces between sections of the cushions, thereby eliminating the possibility of a users arm, or leg, being caught in any crevice. Also, as seen in FIG. 5, the inner, angular cushion 16, eliminates the sharp, ledge type of landing area, and thus eliminates the possibility of a user landing on a sharp edge, with the resulting possibility of a serious accident. The inventor feels this to be a significant improvement over the prior arts studied, and is the second level of safety precaution in this invention. The third level of safety precaution designed by the inventor, again differs from the prior arts, and again, is felt to be a great improvement in the field of freefall simulators. Referring now to FIG. 8, we see a section of a safety netting 5, composed of a netting material which is supported onto a framework 6, in such a manner that each individual cord of the netting is attached to the framework 6. In the prior arts studied, and from much experience in the field of freefall simulators, a trampoline type support system is utilized, whereby the final safety netting is supported in a geometric design, and, if, by chance, one of the support cords does break, an entire section of the support system gives way, thus creating a "hole" large enough that the user has fallen onto the metal grid 27 over the propeller. In this invention, as stated, the entire support system has been changed to a system of netting 5, and, the entire netting 5 is supported by individual cords, and, the breaking of any one cord only allows that little section of the netting to give way, and this is not enough room to allow a user to slip down onto the metal grid 27, which of course is the final level of safety pr(R)caution designed by the inventor for this freefall simulator. Also, this metal grid 27 directly over the turning propeller, has a dual purpose in this invention. The first purpose is for safety reasons, but, the inventor has taken the opportunity here to correct another inherent problem with the prior arts, which is the swirling effect to the air stream on the outside portion of the stream, and the low velocity portion of the airstream over the hub portion of the propeller. The metal grid 27 itself is designed such that the individual parts of the grid are built such that they are the third step in the re-directing of the air stream to a truly vertical direction. As the swirling air comes off the propeller blades, into the first stage of the air directing system, which is seen in FIG. 8. Large individual baffles 8 form a pattern of baffles and further straighten the air stream in a vertical direction. The second step in the re-directing system for the air stream is shown in FIG. 7, where we see a system of "S" shaped baffles. These "S" shaped baffles mount directly over the large individual baffles 8, and accomplish two things. First, the curved shape of the baffles 24 eliminate the low pressure, cavitation area on the rear side of the baffles, and form a smooth flow of the air from the propellers, up through the first two stages of air re-directing baffles, the metal grid, and the large individual baffles 8. Second, the final curvature of the "S" shaped baffles 24 re-direct the air stream outward, towards the outer diameter of the air stream, which enlarges the diameter of the entire air stream, allowing for a larger area for the user of the freefall simulator to fly, and second, the inner row of baffles 8, being turned in the opposite direction, direct the air received towards the center of the air stream, which eliminates the low velocity air stream in the center, over the hub of the propeller. These three baffle systems, working in conjunction, produce a homogeneous air stream, with an enlarged diameter column, and, with no low velocity center column, as encountered in the prior arts.

Figure 3:
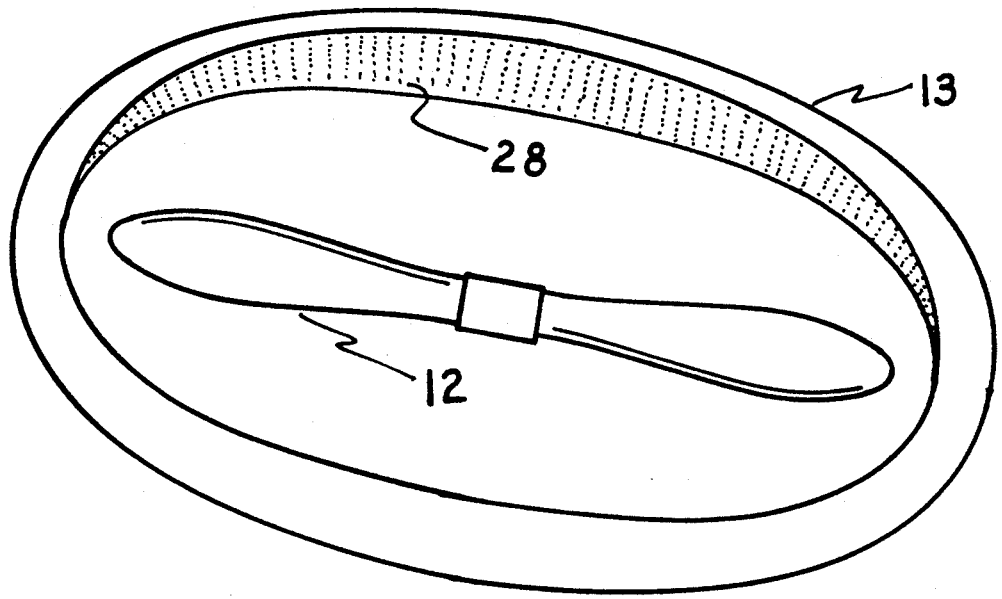
FIG. 3 shows the sound absorbing, perforated shroud, encompassing the propeller.
Figure 4:
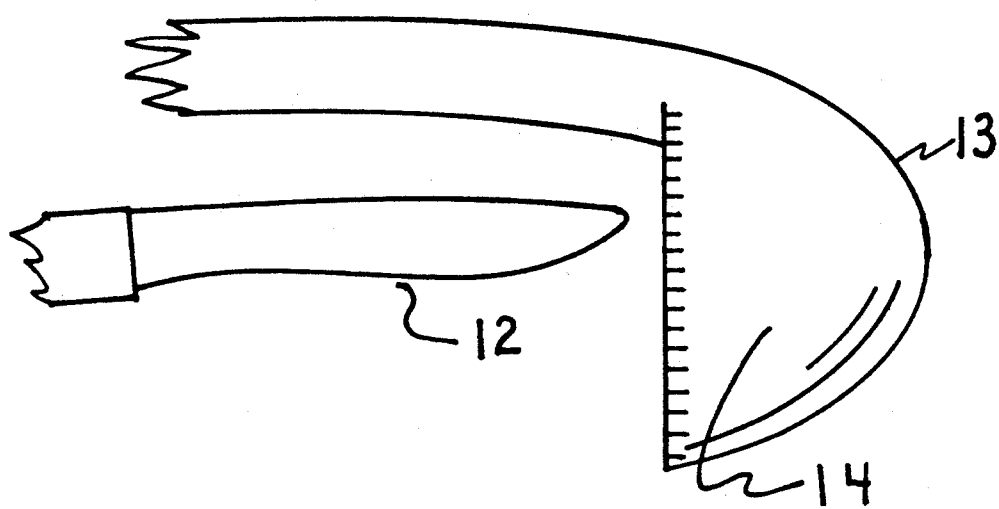
FIG. 4 shows a detail of the sound absorbing shroud.

Another feature of the freefall simulator is in the noise abatement area. In order to keep escaping noise to a minimum, three stages of noise abatement has been introduced. First, a 15 foot high "berm" has been built around the entire Freefall simulator building. This berm directs any noise escaping from the building upward. Second, as shown in FIG. 1, wall sound baffles 2 and an overhead acoustic blanket 9 provide for noise abation within the skeleton framework. Third, as shown in FIG. 3, a noise abatement shroud 13 is built completely around the propeller 12. This shroud has a perforated inner body 28, which directs some of the noise from the propeller into the baffling system 2, and 9 of FIG. 1, and allows the remaining noise to penetrate through the perforations into the center of the shroud 13, which is filled with a sound absorbing material 14, as shown in FIG. 4. This material absorbs most of the noise entering the shroud 13, and directs the remaining noise towards the baffling system 8, and 24, to allow the noise from the propeller to be baffled, or, abated to a very low level. As stated, any noise leaving the building is met by the "berm" completely around the building, which keeps the entire noise level to an acceptable level, and thereby eliminates the problem of noise abatement found in the prior arts.

We claim:

1. A freefall simulator, for simulating the effects, and the feelings of freefall to a person, and training the person to maneuver during the freefall period, comprising:

a building, said building containing, an air accelerating means, said air accelerating means having, a large horsepower electric motor, said motor driving a pair of two hydraulic pumps, said hydraulic pumps providing controlled power means for powering a large hydraulic motor, one of said pumps being driven at full capacity by said electric motor and said other pump being controllingly driven at a variable power output, a controlled pitch propeller, said propeller being driven a predetermined of speed by said fair of hydraulic pumps; and at said speed of said propeller being controlled by the combined output of said two hydraulic pumps, and said large hydraulic motor.

2. A freefall simulator of claim 1, having a vertical air chamber, said chamber directing upwardly the accelerated air from said propeller, and said vertical air chamber being open at its upward end, thereby providing means for a person to enter said accelerated air stream in a freefall position, and said accelerated air stream supporting said person in said freefall position.

3. A freefall simulator of claim 2, further having an adjustable safety harness equipment, said safety harness equipment providing means to control the position of said person in the centermost location of said accelerated air stream of claim 1.

4. A freefall simulator of claim 3 having a circular arrangement of safety cushions at an uppermost outer circumference of said vertical air chamber, thereby providing means for safe entry, or departure of said person from said vertical air chamber.

5. A freefall simulator of claim 4 having an area at an uppermost level of said vertical air chamber; said area having a spectator, or instructor area, said are further providing means for communicating instructions to said person.

6. A freefall simulator of claim 5 having an air deflecting means, said deflecting means providing a true, upwardly accelerating air stream.

7. A freefall simulator of claim 6 having noise abatement means in said vertical air chamber, and said propeller, and said hydraulic pumps, and said hydraulic motor, all as stated in claim 1.

8. A freefall simulator of claim 7, wherein said noise abatement means being an earthen berm surrounding said building.

9. A freefall simulator of claim 8, further having a safety grid means mounted above said propeller; whereby, said safety grid means prevents said person from falling into said propeller, in case of power failure.

10. A freefall simulator of claim 9, wherein said simulator further having a safety net means mounted above said safety grid means, whereby said safety net means provides additional safety for persons using said simulator in case of a power failure.

* * * * *